Aug. 11, 1925.
F. H. GROVE
1,549,112
CHAFER SETTING ATTACHMENT
Filed Oct. 9, 1922
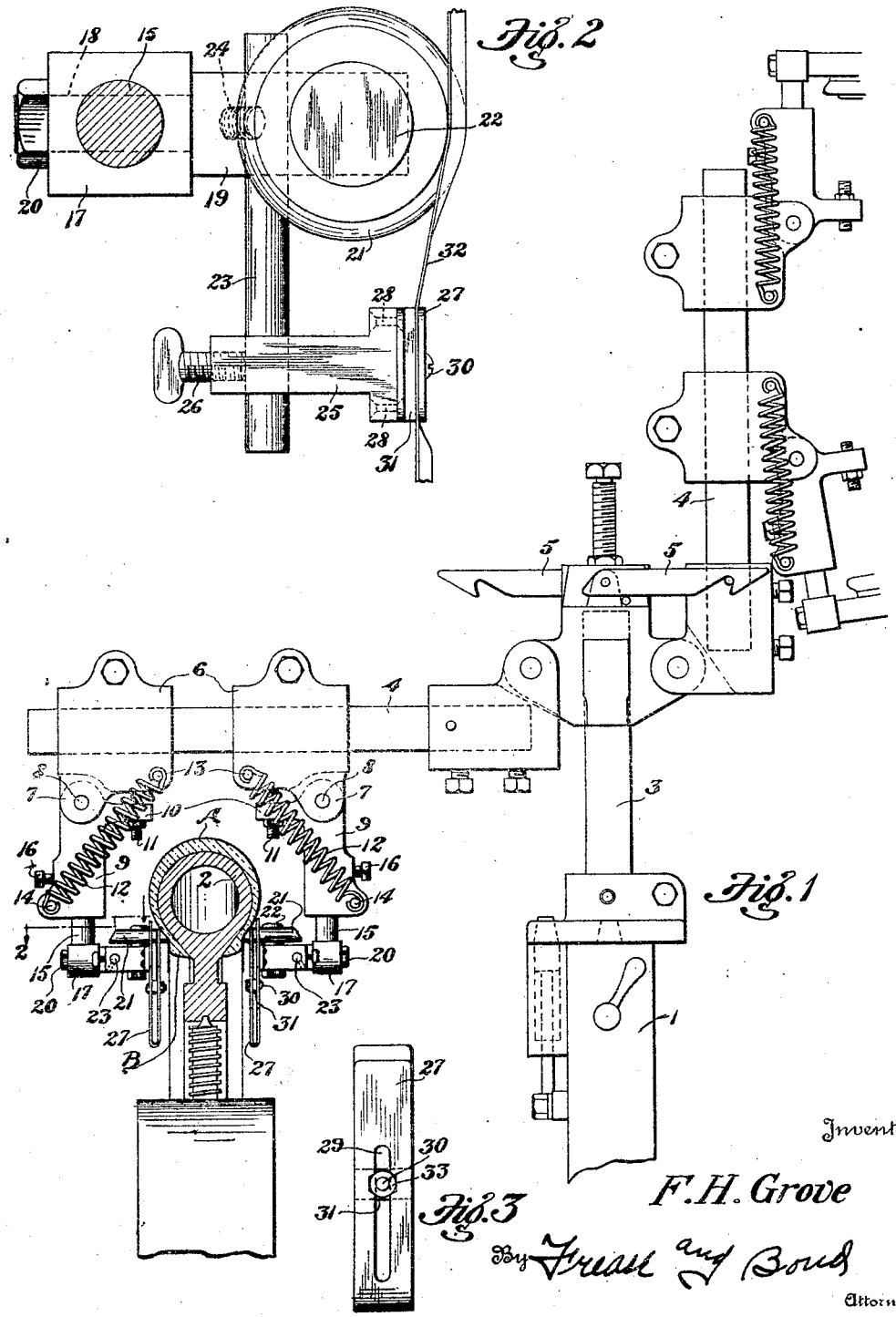
Inventor
F. H. Grove
By Freass and Bond
Attorneys Patented Aug. 11, 1925.

1,549,112

UNITED STATES PATENT OFFICE.

FRANK H. GROVE, OF COLUMBIANA, OHIO.

CHAFER-SETTING ATTACHMENT.

Application filed October 9, 1922. Serial No. 593,338.

*To all whom it may concern:*

Be it known that I, FRANK H. GROVE, a citizen of the United States, residing at Columbiana, in the county of Columbiana and State of Ohio, have invented a new and useful Chafer-Setting Attachment, of which the following is a specification.

This invention relates to an attachment for a tire building machine for setting the chafer strip over the bead upon a tire casing for automobiles and the like, and has for its objects to provide a simple and efficient device upon a tire building machine arranged to co-operate with the rotary core upon which the tire casings are built, to set the chafer strip in the proper position upon the tire casing and to roll the same upon the tire casing as the rotary core revolves.

The above and other objects may be attained by providing a movable arm upon the tire building machine arranged to be moved into operative position relative to the rotary core, and provided with a U-shaped guide for guiding the chafer strip into position upon the tire casing, a roller being located in rear of the guide to press the chafer strip upon the tire casing.

A preferred embodiment of the invention thus set forth in general terms is illustrated in the accompanying drawing, forming part hereof, in which—

Figure 1 is an elevation of a portion of a tire building machine, showing the rotary core in section, the chafer setting attachment embodying the invention being shown in position relative to said core;

Fig. 2, an enlarged sectional view on the line 2—2, Fig. 1; and

Fig. 3, a detail elevation of one of the U-shaped guides.

Similar numerals of reference indicate corresponding parts throughout the drawing.

Referring to Fig. 1 of the drawing, a portion of the frame of a tire building machine, which may be of any usual and well known construction, is indicated at 1, the rotatable core 2 being mounted thereon and arranged to receive the fabric and rubber from which the tire casing is built in the usual manner.

A post 3 is mounted upon the frame 1 and provided with a plurality of hinged arms 4, normally held in vertical position as by the hooks 5 and arranged to be lowered into horizontal position, the post being arranged to be rotated to bring either of said arms over the rotatable core to permit the attachment carried thereby to be brought into operative position with relation to the core.

The present invention relates more particularly to the chafer setting attachment which is designed to guide the chafer strip into position over the bead of the tire carcass, and to roll or press said strip firmly upon the tire casing as the core is rotated. This chafer setting attachment is mounted upon one of the hinged arms 4 and arranged to set the chafer strip upon each side of the tire casing.

For this purpose, a pair of collars 6 is adjustably mounted upon the arm 4 carrying the chafer setting attachment, means 7 being formed upon said collars to which are pivoted as at 8, tubular members 9, each of which is provided with an angular lug 10, upon which is mounted an adjustable stop 11 for engagement with the adjacent collar, to limit the inward movement of said members, as shown in Fig. 1.

Each of the tubular members 9 is arranged to be normally swung upon its pivot to hold the stop 11 thereon in engagement with the collar upon which the same is mounted, by means of the pull springs 12, each of which is connected at its opposite ends to the block and tubular member as at 13 and 14 respectively, in such position that when the members 9 are drawn into the operative position, the springs will move over the pivoted center 8 thereof, holding the same in this position and when the tubular members are moved into the inoperative position, the springs will again move over the pivotal center, holding the members in the inoperative position.

A rod 15 is located in each tubular member 9 and held in adjusted position by a set screw 16, each of said rods having a head 17 which receives the reduced threaded shank 18 of the block 19, a nut 20 being mounted upon said threaded shank for fixedly connecting the block 19 to the head 17.

The chafer setting roller 21 is journaled upon a vertical stud 22 carried upon each block 19 and arranged to engage the side wall of the tire casing A just above the bead B, as best shown in Fig. 1. A rod 23 is located through the block 19 and held against movement therein as by the set screw 24, a block 25 being adjustably mounted upon the rod 23 and arranged to be held in adjusted position by the thumb screw 26.

A U-shaped guide strip 27 is connected to the block 25 as by the rivets 28, the arms of said strip being vertically slotted as at 29 to receive a bolt 30 upon which is mounted a washer 31 over which the fabric chafer strip, as shown at 32, is arranged to be passed, this washer being adjustable vertically within the U-shaped guide by means of the bolt 30 and nut 33 to accommodate chafer strips of various widths.

When it is desired to use the chafer setting attachment, the arm 4 carrying the same, is moved into horizontal position above the core 2, as shown in Fig. 1, and the tubular members 9 are swung toward each other upon their pivots, the springs 12 pulling the same into the operative position, bringing the guides 27 and rollers 21 into operative position relative to the core, as shown in Fig. 1.

The chafer strip 32 is placed through the U-shaped guide member 27, the lower edge thereof resting upon the washer 31, the guide member thus guiding the strip and holding it in the proper relative position to the tire casing. As the core is rotated, the roller 21 will press the chafer strip upon the tire casing above the bead B thereof, as best shown in Fig. 1, the lower edge of the chafer strip hanging down beneath the bead. This lower edge of the strip may be pressed beneath the bead in any usual manner as by the ordinary stitching wheels of the machine.

From the above, it will be evident that a chafer setting attachment is provided which may be normally held in the inoperative position, during the building of the tire casing, without interfering therewith, and which may be easily and quickly moved into operative position and operated to properly set the chafer strip over the bead of the tire casing and press the same firmly upon the casing.

I claim:—

In combination with a rotatable tire building core, a chafer setting attachment including a hinged arm arranged to be lowered above the core, a pair of rods hinged upon said arm and arranged to be lowered upon each side of the core, an upright, open ended, U-shaped guide member upon each rod for guiding the chafer strip over the bead of the tire casing and a beveled roller upon each rod in rear of the guide member for pressing the chafer strip upon the casing.

FRANK H. GROVE.